US010790724B2

(12) United States Patent
Coman

(10) Patent No.: US 10,790,724 B2
(45) Date of Patent: Sep. 29, 2020

(54) APPARATUS AND METHOD OF GENERATING ENERGY FROM RENEWABLE ENERGY SOURCES

(71) Applicant: Christopher John Anthony Coman, Evesham (GB)

(72) Inventor: Christopher John Anthony Coman, Evesham (GB)

(*) Notice: Subject to any disclaimer, the term of this patent is extended or adjusted under 35 U.S.C. 154(b) by 21 days.

(21) Appl. No.: 15/765,934

(22) PCT Filed: Aug. 25, 2016

(86) PCT No.: PCT/GB2016/052653
§ 371 (c)(1),
(2) Date: Apr. 4, 2018

(87) PCT Pub. No.: WO2017/060669
PCT Pub. Date: Apr. 13, 2017

(65) Prior Publication Data
US 2018/0287461 A1 Oct. 4, 2018

(30) Foreign Application Priority Data
Oct. 5, 2015 (GB) .................................. 1517525.0

(51) Int. Cl.
H02K 7/18 (2006.01)
F03D 9/00 (2016.01)
(Continued)

(52) U.S. Cl.
CPC ........... H02K 7/1823 (2013.01); F03B 13/26 (2013.01); F03D 1/00 (2013.01); F03D 3/005 (2013.01);
(Continued)

(58) Field of Classification Search
CPC ........... F05B 2210/16; F05B 2220/706; F05B 2240/40; F05B 2240/50; F05B 2260/4031;
(Continued)

(56) References Cited

U.S. PATENT DOCUMENTS 5,495,128 A * 2/1996 Brammeier ............... F03D 3/00
290/55
6,710,489 B1 * 3/2004 Gabrys .................. H02K 7/025
310/74
(Continued)

FOREIGN PATENT DOCUMENTS

CA 2779898 A1 12/2013
CN 101710767 A 5/2010
(Continued)

OTHER PUBLICATIONS

Written Opinion of the Int'l Searching Authority, dated Jul. 12, 2017.
(Continued)

Primary Examiner — Charles Reid, Jr.
(74) Attorney, Agent, or Firm — Betsy Kingsbury Dowd; BKDowd Law, P.C.

(57) ABSTRACT

An electrical energy generator array generates electricity from at least one form of natural flow, the generator having a drive shaft driven by energy from a natural energy flow and connected to a drive mechanism. The generator includes an integrated electric motor and a plurality of individual generators disengageably connected to the drive mechanism. Each generator is connected via a series of ties to form a connected generator array, the array being rotated by the drive mechanism when connected thereto, or by the integrated electric motor when disconnected from the drive mechanism, to generate electricity. The generator may include an electrical storage device arranged to power the integrated electric motor. A method of generating electricity from at least one natural energy flow, for supply to an electrical storage device, for local use or for supply to an electric grid includes using an electrical energy generator array as described.

20 Claims, 6 Drawing Sheets

(51) Int. Cl.

| | | |
|---|---|---|
| F03D 9/11 | (2016.01) | |
| F03D 9/25 | (2016.01) | |
| F03D 80/70 | (2016.01) | |
| F03D 1/00 | (2006.01) | |
| F03D 3/00 | (2006.01) | |
| H02K 7/08 | (2006.01) | |
| H02J 7/35 | (2006.01) | |
| H02S 10/12 | (2014.01) | |
| H02S 40/38 | (2014.01) | |
| H02K 11/20 | (2016.01) | |
| F03B 13/26 | (2006.01) | |
| H02J 7/14 | (2006.01) | |
| H02K 7/102 | (2006.01) | |
| H02K 7/116 | (2006.01) | |
| H02K 11/00 | (2016.01) | |
| H02S 50/00 | (2014.01) | |

(52) U.S. Cl.
CPC ............ *F03D 9/00* (2013.01); *F03D 9/007* (2013.01); *F03D 9/11* (2016.05); *F03D 9/25* (2016.05); *F03D 9/255* (2017.02); *F03D 80/70* (2016.05); *H02J 7/14* (2013.01); *H02J 7/35* (2013.01); *H02K 7/08* (2013.01); *H02K 7/085* (2013.01); *H02K 7/102* (2013.01); *H02K 7/116* (2013.01); *H02K 7/1838* (2013.01); *H02K 11/0094* (2013.01); *H02K 11/20* (2016.01); *H02S 10/12* (2014.12); *H02S 40/38* (2014.12); *H02S 50/00* (2013.01); *F05B 2210/16* (2013.01); *F05B 2220/706* (2013.01); *F05B 2240/40* (2013.01); *F05B 2240/50* (2013.01); *F05B 2260/404* (2013.01); *F05B 2260/4031* (2013.01); *F05B 2260/42* (2013.01); *F05B 2280/2004* (2013.01); *H02K 7/183* (2013.01); *Y02E 10/28* (2013.01); *Y02E 10/38* (2013.01); *Y02E 10/72* (2013.01); *Y02E 10/74* (2013.01)

(58) Field of Classification Search
CPC ............ F05B 2260/404; F05B 2260/42; F05B 2280/2004; H02K 11/20; H02K 7/08; H02K 7/085; H02K 7/102; H02K 7/116; H02K 7/1838; H02K 11/0094; H02K 7/1823; H02K 7/183; Y02E 10/38; Y02E 10/72; Y02E 10/74; Y02E 10/28; H02S 10/12; H02S 40/38; H02S 50/00; F03D 9/11; F03D 9/25; F03D 80/70; F03D 9/255; F03D 1/00; F03D 3/005; F03D 9/00; F03D 9/007; F03D 13/26; F03B 13/26; H02J 7/14; H02J 7/355
USPC ........................ 290/43, 44, 53, 54
See application file for complete search history.

(56) References Cited

U.S. PATENT DOCUMENTS

| | | | | |
|---|---|---|---|---|
| 6,856,036 | B2* | 2/2005 | Belinsky | F03B 17/063 290/42 |
| 7,075,189 | B2* | 7/2006 | Heronemus | B63B 1/047 290/44 |
| 7,218,012 | B1* | 5/2007 | Edenfeld | F03D 7/0224 290/44 |
| 7,808,121 | B1* | 10/2010 | Glynn | B60L 8/006 290/55 |
| 8,546,966 | B1* | 10/2013 | Santos | F03B 11/002 290/43 |
| 8,564,148 | B1* | 10/2013 | Novak | H02K 7/183 290/52 |
| 8,643,204 | B2* | 2/2014 | John | F03D 9/17 290/43 |
| 8,937,399 | B2* | 1/2015 | Freda | F03D 80/70 290/55 |
| 9,103,321 | B1* | 8/2015 | Bardia | F03D 13/20 |
| 2005/0140483 | A1* | 6/2005 | Wobben | H01F 38/18 336/182 |
| 2008/0157528 | A1* | 7/2008 | Wang | F03D 9/17 290/43 |
| 2008/0246283 | A1* | 10/2008 | Perin | F03B 17/025 290/54 |
| 2009/0048051 | A1* | 2/2009 | Koleoglou | F16H 55/10 475/183 |
| 2009/0115193 | A1* | 5/2009 | Branco | F03B 13/10 290/54 |
| 2009/0134623 | A1* | 5/2009 | Krouse | F03B 13/08 290/43 |
| 2009/0267347 | A1* | 10/2009 | Abatemarco | F03B 13/10 290/43 |
| 2010/0207453 | A1* | 8/2010 | Ottman | F03D 9/007 307/72 |
| 2011/0018280 | A1 | 1/2011 | Mahaffy et al. | |
| 2011/0101697 | A1* | 5/2011 | Power, III | B63B 35/44 290/54 |
| 2011/0109090 | A1* | 5/2011 | Bolin | F03B 17/061 290/54 |
| 2011/0140443 | A1* | 6/2011 | Morrison | F03D 9/35 290/55 |
| 2012/0112465 | A1* | 5/2012 | Morrison | F03D 9/25 290/55 |
| 2012/0175883 | A1* | 7/2012 | Nica | F03D 3/061 290/55 |
| 2012/0187695 | A1* | 7/2012 | Desplats | F03D 1/02 290/55 |
| 2013/0043685 | A1* | 2/2013 | Sireli | F03B 11/02 290/54 |
| 2013/0115118 | A1 | 5/2013 | Chien | |
| 2013/0264829 | A1* | 10/2013 | Jordan, Sr. | F03D 9/007 290/55 |
| 2013/0334823 | A1* | 12/2013 | Hopper | F03B 13/264 290/54 |
| 2013/0341930 | A1* | 12/2013 | Campagna | F03B 3/04 290/54 |
| 2014/0232227 | A1* | 8/2014 | Ionel | B60W 10/105 310/103 |
| 2015/0028590 | A1* | 1/2015 | Wamble, III | B60L 13/04 290/43 |
| 2016/0059938 | A1* | 3/2016 | Momayez | H02S 10/40 |
| 2016/0123299 | A1* | 5/2016 | Zhao | F03D 3/005 290/55 |

FOREIGN PATENT DOCUMENTS

| | | |
|---|---|---|
| CN | 201705557 U | 1/2011 |
| CN | 102192095 A | 9/2011 |
| CN | 202746098 U | 2/2013 |
| CN | 204212921 U | 3/2015 |
| DE | 4436057 A1 | 3/1995 |
| DE | 202012104685 U1 | 12/2013 |
| GB | 2498594 A | 7/2013 |
| JP | 2005315266 A | 11/2005 |
| JP | 200632106 A | 12/2006 |
| KR | 1020120117282 A | 10/2012 |
| KR | 101285545 B1 | 7/2013 |
| KR | 101309438 B | 9/2013 |
| WO | 2009141496 A | 11/2009 |

OTHER PUBLICATIONS

UK Intellectual Property Office, Search and examination report (dated Oct. 5, 2017).
UK Intellectual Property Office, Search report (dated May 19, 2016).

(56) References Cited

OTHER PUBLICATIONS

UK Intellectual Property Office, Search report (dated Feb. 11, 2016).

* cited by examiner

APPARATUS AND METHOD OF GENERATING ENERGY FROM RENEWABLE ENERGY SOURCES

CROSS-REFERENCE TO RELATED APPLICATIONS

This application is a national phase filing under 35 U.S.C. § 371 of International Application No. PCT/GB206/052653, having an International filing date of Aug. 25, 2016, and claims priority via the international application in accordance with 35 U.S.C. § 365 to Patent Application No. GB 1517525.0, filed on Oct. 5, 2015, the entireties of which are both incorporated herein by reference thereto.

TECHNICAL FIELD

This invention relates to an apparatus and method for generating and storing energy derived from renewable natural flow energy sources.

This invention is particularly concerned with generating and storing power generated by natural occurring energy flows or sources such as wind, solar, hydro, tidal energy.

BACKGROUND

There is an ever increasing demand for alternative, emission free, renewable energy to supply the world's electricity demands. As transportation moves towards use of electrically driven technologies the demand for emission free power will only increase. In some parts of the world water supply is a primary need and in some cases the supply of water is from the sea and desalination of the water is required. Desalination of water requires massive amounts of electricity to provide clean water.

The provision of clean emission free electricity for transportation, cooking, heating water, domestic use and for an ever increasing use within industry and business is essential. The continuing use of coal and gas to generate electrical power is not sustainable in the long term. An additional need is to provide electricity to rural and poverty stricken locations in order to reduce burning of carbon based fossil fuels and to reduce climate change.

Natural flow generated energy is a renewable energy that does not result in any carbon emissions and is a viable alternative which will reduce the need for continued use of and reliance on fossil fuels. The term natural flow will be used hereinafter to mean a renewable energy source that does not result in direct carbon emissions and examples are wind, hydro, solar and tidal energy flows.

There exist numerous wind driven solutions both onshore and offshore for generating electricity but these are limited to the power output of the natural wind flows and also by the structural demands required to house and rotate a large capacity single generator and the wind flow drive gear. Currently blade lengths exceed 80 m for each blade required to drive a high capacity 8 MW generator. A 10 MW Wind Turbine is currently under test and there is a conceivable possibility of a 20 MW Wind Turbine using current designs and technologies and these will also require the use of large blades. These "turbines" also stand dormant when wind flow is low, non-existent or if safety limits are reached due to wind flows that are too high. When dormant no electricity is produced by the turbines.

Solar energy can only be produced during daylight hours and maximum output is dictated by the amount of direct sunlight absorbed or reflected to produce electricity. Solar arrays can consume vast areas of land and/or rooftop space in order to provide electricity. On average solar energy produces approximately 1,000 watts per square meter at noon on a cloudless day.

Tidal energy has yet to be used with any great success, despite numerous designs and trials. Should harnessing this natural energy flow become effective it will again provide peaks & troughs in energy production due to natural variation as the tide flows in or out. This will however provide some form of predictability and controllability.

The most successful form of renewable energy electricity production that is controllable is hydro based, whereby electricity is produced from generators driven by water flow from water that is stored in dams. During low demand periods, generated electricity is used to pump water back to these reservoirs.

A fundamental flaw with wind, tidal and solar renewable energy technologies currently is that they are solely reliant on the natural flows to power them. These natural flows are not always available, stable or consistent and in the case of hydro, wind and solar, optimal sites are often located far from residential, city and industrial centres where power is required. Consequently the electricity grid has to expand to collect power from these sources and also from existing power stations to supply areas and locations where power is required.

SUMMARY

According to a first aspect of the invention there is provided an electrical energy generator, arranged to generate electricity from at least one form of natural flow, the generator having a drive shaft driven by energy from a natural energy flow and connected to a drive mechanism, the generator further comprising an integrated electric motor and a plurality of individual generators disengageably connected to the drive mechanism, the individual generators being connected via a series of ties to form a connected generator array, the array being rotated by the drive mechanism when connected to the drive mechanism, or by the integrated electric motor when disconnected from the drive mechanism, to generate electricity.

Preferably, at least two and more preferably between three and eight, and more preferably four, ties are used to connect the series of generators to form the array. The ties may be positioned at equal intervals around the array of generators.

Preferably, each tie is at least substantially rigid.

Preferably, each tie is at least substantially rigidly connected to each generator of the generator array.

Preferably the electricity generated by rotation of the drive mechanism is either supplied to an electricity supply grid, used locally or stored in an electrical storage device which may be on site or off site.

The electrical storage device 7 may be one or more batteries 9. Preferably each battery 9 is on site. The electrical storage device 7 may be of a conventional type arranged to be charged when surplus energy is diverted to the battery 9 and to be able to discharge energy as required.

Preferably each individual generator comprises a rotor and stator brushless type generator. Connection of the individual generators to the drive shaft by means of the ties forms an array which can be sized to suit the conditions and the needs of the user.

The drive shaft of the generator may be driven by wind, tidal or hydro flows or a combination of flows. Other types of natural flows may also be utilised. The generator may be driven by wind power and the motion of vanes may be converted to rotational movement to drive the drive shaft. In other embodiments the generator array may be driven by solar power and the electrical energy generated by solar panels may be utilised to drive an integrated electric motor or motors rotating the connected generator array. It will be understood the generator array may also be driven by flowing water in a river or by water flowing as a result of tidal flows. Other forms of natural energy flows may also be used.

As the generator array incorporates an integrated electric motor, the array can be switched on/off remotely as and when generation is required. This generator array can therefore effectively be run continuously by either the natural flow means, when the natural flow is sufficient, or via locally stored energy that is used to drive the array when the natural flow is insufficient. The array may therefore be able to produce a more efficient, reliable, cost-effective and stable electricity supply and increase the overall return on investment.

Optionally the array may be arranged to drive a mechanical device which desirably is attached to the array or arrays.

Preferably each individual generator has a capacity of from 1 W to 50 MW or more preferably from 1 W to 10 MW or more preferably from 1 W to 5 MW. In a preferred embodiment each individual generator has a capacity of from 1 KW to 5 MW.

Preferably each generator array may have a capacity of from 1 W to 50 MW or preferably from 1 W to 100 MW or most preferably from 5 KW to 50 MW.

It is desirable that the individual generators form a connected generator array such that the overall capacity of the generator is scalable from a small multi Watt generator to a large multi megawatt generator. Each of the individual generators can be "stacked" or arranged on a central support shaft and connected by ties to a drive mechanism to enable the generator to have an increased overall capacity. The ties may be parallel to the central support shaft.

The generator array may comprise between 2 and 100 individual generators or from 2 to 50 individual generators or from 2 to 20 individual generators.

An advantage is that the individual generators can be assembled in a factory in smaller configurations and the individual generators can be coupled and stacked on site, so minimising the cost and complexity of transportation. Since each individual generator is assembled in a smaller configuration these are easier to transport by road or sea to the desired location of the generator array.

Alternatively or additionally, small stacks of generators may be manufactured and transported, and these small stacks may then be assembled into larger stacks to meet power requirements of a user. For example, sub-stacks of 2-10 generators may be produced and then coupled to make larger stacks as required. In such cases, the tie elements of each sub-stack may be connected together to form the ties of the completed stack.

The terms "ties" and "tie elements" are used interchangeably herein.

In some embodiments the generator array further comprises a structural support tower housing the generator array. The structural support tower may also support blades arranged to interact with natural flows and to drive the central drive shaft and hence the drive mechanism. The support tower may also provide a location for the mounting of a solar panel or an array of solar panels.

In a preferred embodiment the generator array further comprises an electrical storage device 7. Desirably the electrical storage device 7 is a battery 9 or several batteries 9 and the battery 9 is arranged to be charged by a natural flow of energy. In some embodiments the battery may be charged by solar power. In other embodiments the battery may be charged by electricity generated by the generator array. As the energy stored by the or each battery 9 is relatively small it is possible to use conventional batteries and storage means, that are already available, so overcoming one of the problems associated with large scale storage of renewable energy generated from natural energy flows to feed the grid during peak times.

Preferably the generator array further comprises an integrated electric motor or motors which may be arranged to be powered by the electrical storage device and/or energy from the grid. The integrated electric motor may use energy stored in the battery to rotate the generator array once an electromagnetic coupler is activated and the generator array is disengaged from the natural flow drive mechanism. This would take place when there is no natural flow of energy to drive the drive shaft and the drive mechanism, or if the natural flow cannot be used due to operational safety limits. For example the battery may be used to store energy from a solar power unit that is separate from the generator array or may store surplus energy from the generator array. The generator array, storage device and electric motor may therefore be used for load balancing.

The electric motor is integrated into the generator array and is only activated when the generator array is disengaged, for example via the electromagnetic coupler, from the natural flow drive mechanism. If there is no need for electrical energy, either locally or from the grid, then the electric motor does not have to be engaged. Desirably when the integrated electric motor is engaged to drive the generator array the electromagnetic coupler disengages the natural flow drive mechanism. The natural flow drive mechanism is preferably held in place by friction brakes when the electromagnetic coupler engages or disengages. The natural flow drive mechanism may be held in place out of connection with the central drive shaft when the natural flow is non-existent, too low or too high. When the natural flow drive mechanism is disengaged the generator array can then be driven by the integrated electric motor to provide a more controlled and consistent electricity supply. It is also possible to scale the number of electric motors integrated into the array to allow for standby of a failed motor.

There may also be provided an electrical energy generator, arranged to generate electricity from at least one form of natural flow, the generator having a drive shaft connected to a natural flow drive mechanism the generator further comprising a plurality of individual generators disengageably connected to the drive mechanism, each individual generator being adapted to use rotation of the natural flow drive mechanism to generate electricity and wherein the generator further comprises an electrical storage device arranged to be charged by energy from the natural flow and to be able to power an electric motor to drive the generator array at times when the natural flow cannot be utilised to drive the drive mechanism.

In some embodiments the array may be connected to a mechanical device. Rotation of the array may drive the attached mechanical device. In some embodiments the natural flow drives the array to charge an electrical energy storage device. The stored electricity may be used to drive the integrated electric motor and rotation of the array may be used to drive the attached mechanical device.

Preferably the array of generators is disengeably connected to the natural flow drive mechanism via an electromagnetic coupler.

The individual generators are connected together to form a generator array. In a preferred embodiment each individual generator is connected via a series of ties to form the array. Preferably, at least two or more preferably at least three ties are used.

Desirably the electric motor is integrated in the generator array. In some embodiments there may be at least one additional electric motor as a back-up motor.

Preferably the electric motor can be moved into engagement with the generator array. In a preferred embodiment this is by means of an electro-magnetic coupler. Desirably the natural flow drive mechanism can also be disconnected or disengaged from the generator array when it is desired to connect the electric motor and while the electric motor is engaged. Disengagement of the drive mechanism may be by means of an electromagnetic coupler. A drive gear box may also be utilised. A friction brake may be used to slow or hold the natural flow drive shaft when insufficient natural flows are available or operational limits are reached or when the generator array requires disengagement from the natural flow drive mechanism in order to be driven by the integrated electric motor.

It will be appreciated that disengaging the array from the natural flow drive mechanism before engagement of the electric motor improves efficiency as otherwise the integrated motor would have to rotate the array and the natural flow mechanism (e.g. turbine blades), thus requiring a substantially more powerful motor and consuming significantly more stored electricity.

It will be appreciated that electricity produced by the generator array and/or attached or localised solar panels can be fed into the national grid as well as being able to be used locally or to charge the electrical storage device or devices required to drive the electric motor when demand is high but the renewable source flow is low. The generator thus provides a more continuous and controllable electricity supply from a renewable energy emissions free source.

It has been found that there are difficulties with large scale grid storage of energy produced when natural flows are at their optimum. This has been considered to be a disadvantage to the use of natural flows of energy for electricity generation. As technology is not yet commercially available for large scale storage, power generated during optimum flow cannot presently be stored and controlled to supply the electricity grid when demand is high but natural energy flows are low.

It is believed that the generator comprising a generator array in accordance with the first aspect of the invention overcomes these drawbacks by storing and drawing power from the electrical storage device which may be a localised battery array that is charged by excess energy from natural flow and or from solar energy. This stored power is then drawn on to drive an integrated electric motor in the generator array.

Preferably a flow of electricity from the generator is monitored and controlled. The controller may be remote. Preferably the control may be by a controller circuit housed at the installation site. The controller may be a computer arranged to monitor and control the generator. The controller is preferably able to monitor at least one of generator output; battery charge level; energy demand from the grid; islanding; rotation speed; natural flow speed; motor engagement; generator disengagement from flow drive mechanism and other sensors housed within the generator.

It will be appreciated that the generator provides significantly enhanced electricity generation from a more stable and controlled supply that is not totally dependent on the flow of renewable energies. The system is completely emissions free and does not rely on any fossil or man-made fuels. The use of stored electrical energy generated by natural energy flow to provide energy to the integrated electric motor in the generator array and in-turn to the electric grid at times of low supply and high demand reduces the need to rely on power stations powered by fuels that release carbon emissions and or are nuclear which in their own right pose significant risk to the environment and long term financial cost in providing energy.

Advantageously the generator array can be easily and cost effectively scaled from small to large capacity grid connected or off-grid requirements and can be assembled in a vertical or horizontal configuration. Scaling of the generator may be carried out by adding to or removing individual generators from the generator.

Desirably the generator may utilise a number of designs for interacting with natural flows that will allow the generator to use natural flows from solar, wind, hydro and tidal driven generator arrays. In some embodiments the central shaft may be driven by a wind, hydro or tidal driven blades that may be horizontally or vertically mounted. The blades or airfoils may be small scale. Large scale blades are not necessarily required to drive the natural flow drive mechanism in order to obtain high electricity generation from the generator array as is currently the case with large capacity wind turbines.

In another embodiment the generator array may be rotated by means of an integrated electric motor using solar energy generated by a solar panel array 49. Solar energy from the solar panel array 49 may be fed directly to the grid and or stored in the on-site batteries 9. Alternatively the electricity from the solar panel array 49 may be used to drive the integrated electric motor and output from the generator array may be fed to the grid.

Output from the generator array would be greater than the output from the solar array enhanced efficiencies are achieved. For example, if the solar array output is 5 KW and this is used to charge an array of batteries and this battery array can drive the integrated electric motor in a 1 MW generator array then there is a positive output gain of 950 KW assuming operational losses of 5 KW through charging, discharging and transmissions.

In some preferred embodiments vertical blades may be utilised. Solar panels may be affixed to the support tower to provide additional energy to the grid or localised electrical storage which may be in the form of a battery or batteries.

It has been found that in the case of wind flow, towers used to support the blades and the drive gearbox do not have to be significantly high to catch high speed winds to turn the generator array as is the case with large scale, high capacity single turbine wind driven generators. Advantageously the generator array can also operate in relatively low wind speeds due to the limited rotation resistance of the generator array and motor. The relatively low height of the towers means that land based versions of the generator array can be sited near the existing grid infrastructure so decreasing the inefficiencies resulting from long transmission lines.

Preferably each individual generator may comprise a single high life cycle sealed ceramic bearing in each brushless generator. The integrated electric motor may also comprise a single high life cycle sealed ceramic bearing.

Advantageously use of the single high life cycle sealed ceramic bearing greatly increases the lifespan of the or each individual generator and reduces maintenance costs and down time. A gear box located between the natural flow drive mechanism and the generator array will preferably contain high lifecycle lubricants. Desirably all other bearings required will be ceramic based.

It is anticipated that use of the generator array according to the first or second aspect of the invention will significantly reduce transportation and specialised erecting equipment costs due to the smaller component sizes of the tower, blades and generator array.

According to a second aspect of the invention there is provided a method of generating electricity for supply to an electrical storage device, for local use or for supply to an electric grid using the generator in accordance with the first aspect of the invention.

Preferably energy from a natural flow is stored in an electrical storage device. The energy from the natural storage device can be used to power an integrated electric motor to drive the generator array if the natural flow cannot be utilised for any reason.

Preferably when it is desired to use the electric motor the generator array is disengaged from the natural flow drive mechanism. This may be by means of an electromagnetic coupler.

According to a third aspect of the invention there is provided an individual generator comprising a rotor and a corresponding stator mounted on a support bracket on a shaft portion, the shaft portion being connectable to a corresponding shaft portion of another individual generator and wherein the rotor is connectable to a plurality of tie elements to be able to form a generator array.

According to a fourth aspect of the invention there is provided a method of making a generator the method comprising providing a support shaft and a natural flow drive shaft rotatable by at least one natural flow, the method further comprising mounting at least two individual generators on the support shaft, connecting the generators using a plurality of ties to form an array and connecting the array to a drive mechanism driven by the natural flow drive shaft.

Preferably the method comprises connecting the natural drive flow shaft to the generator array via a gearbox and optionally also via an electromagnetic coupler.

The individual generators are connected together to form the generator array and in a preferred embodiment each individual generator is connected via a series of ties to form the array.

BRIEF DESCRIPTION OF THE DRAWINGS

The invention will now be described by way of example only with reference to the accompanying figures in which.

DETAILED DESCRIPTION

Figure 1:
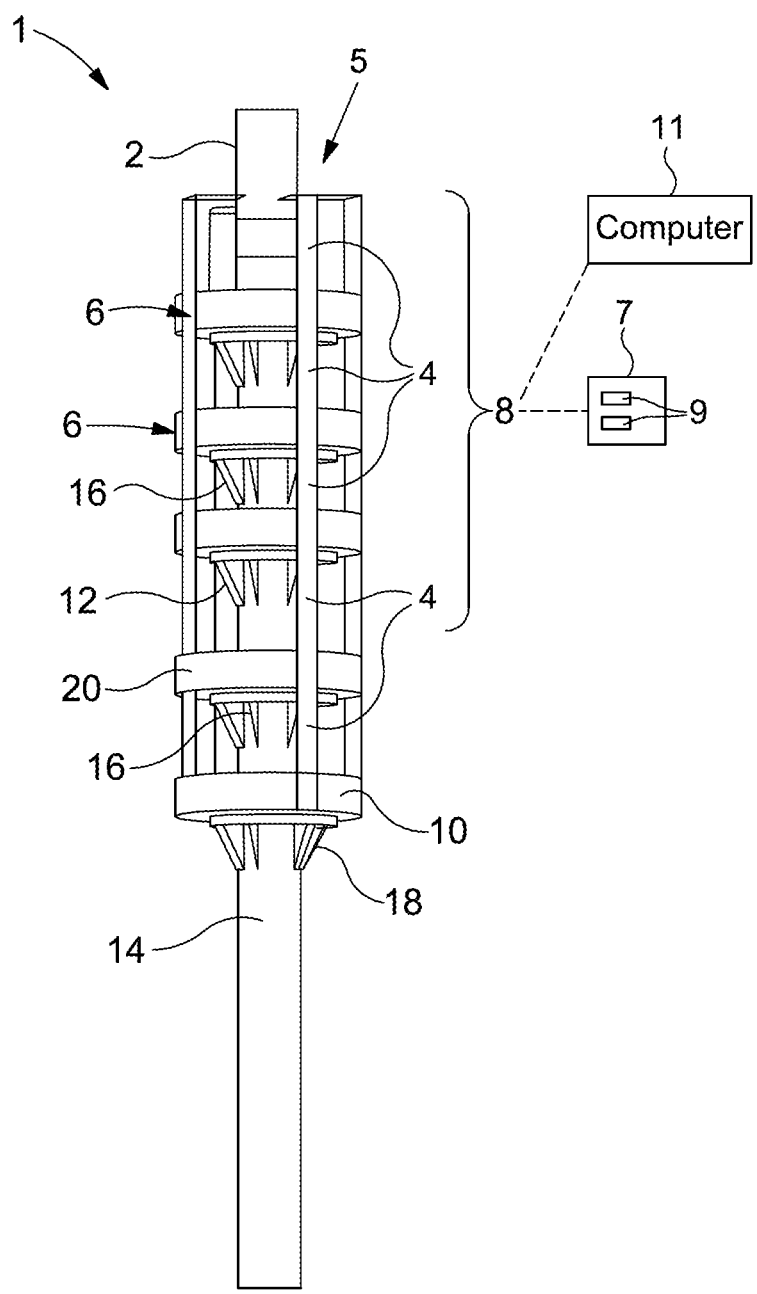
FIG. 1 is a schematic view of a generator array in accordance with the invention and incorporating an electric drive motor.

FIG. 1 is a schematic view of a generator apparatus 1 in accordance with the invention and arranged to generate electricity from at least one form of natural flow, the generator having a drive shaft 2, which may be a central drive shaft as shown, driven by a natural energy flow and connected to a number of ties 4 which are in-turn connected to a number, or array 8, of individual generators 6, the number of ties 4 thus forming a drive mechanism 5 for the array 8. Rotation of the drive mechanism 5 in-turn rotates the array 8 and generates electricity. The generator array 8 comprises a plurality of individual generators 6 each of which is also connected to the natural flow drive mechanism via the electromagnetic coupler, each individual generator being arranged to use rotation of the drive mechanism or the integrated electric motor 20, shown in FIG. 2, for example, to generate electricity.

Figure 2:
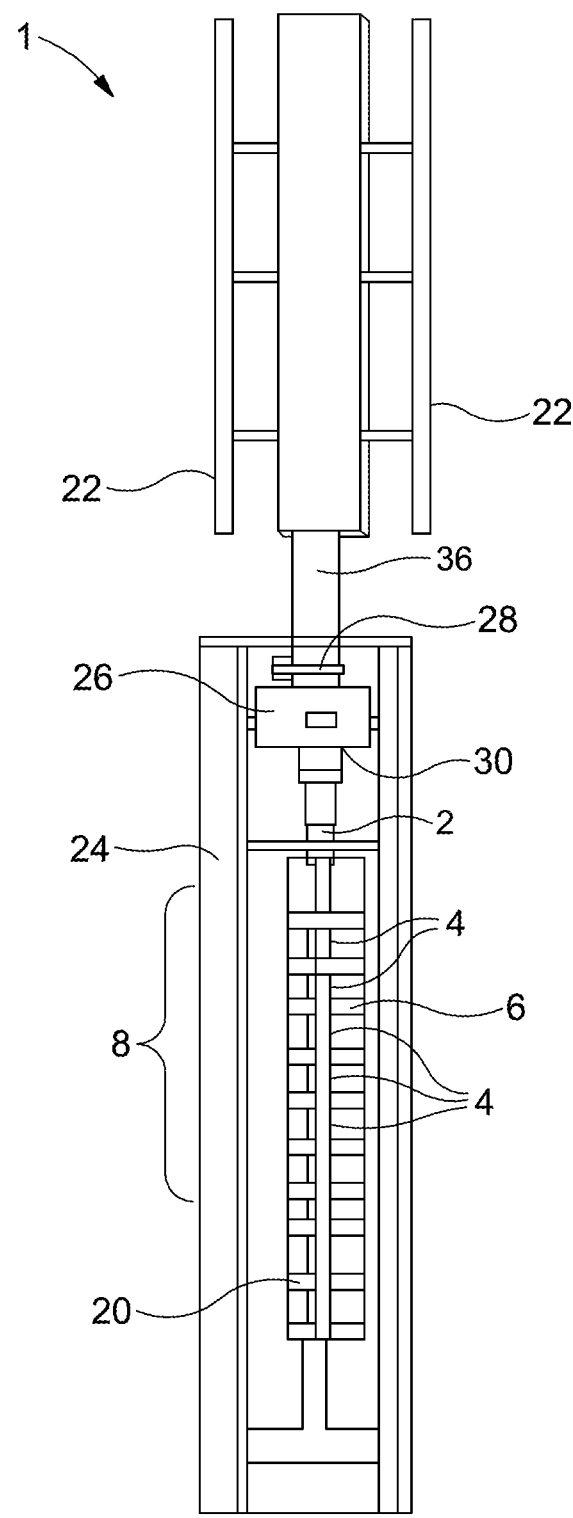
FIG. 2 is a schematic view of a generator array with vertical drive blades.
Figure 3:
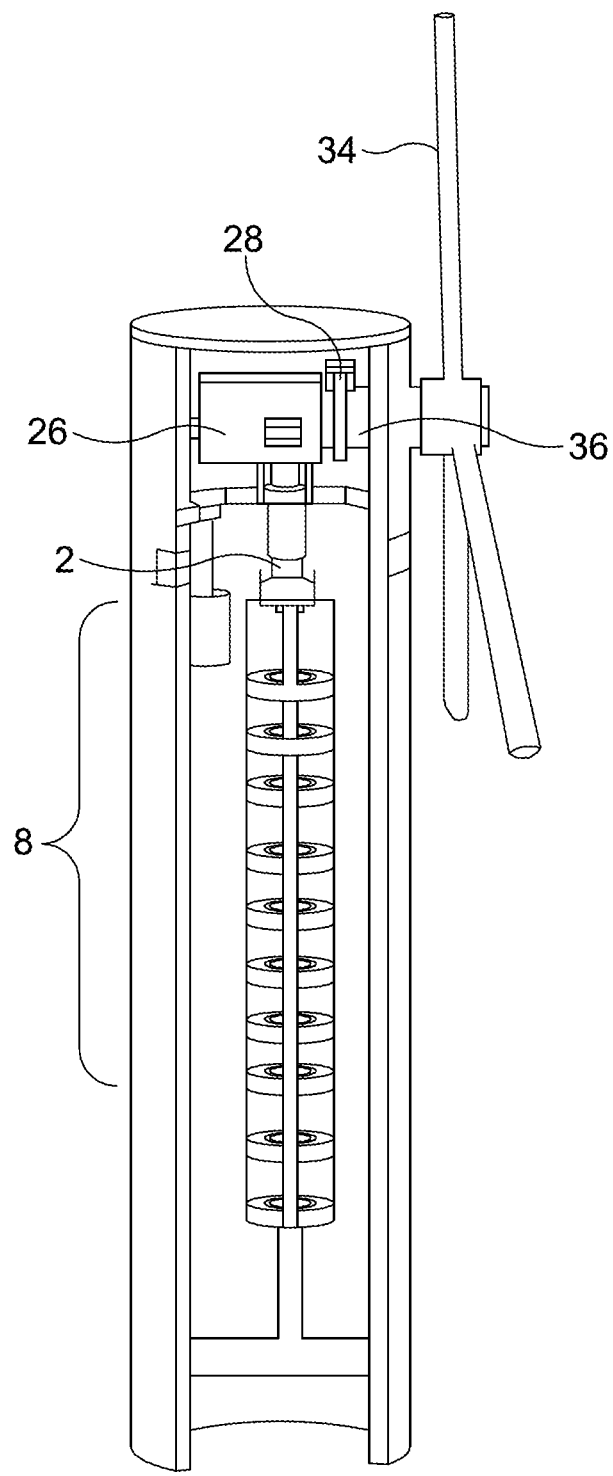
FIG. 3 is a schematic view of a generator array with horizontal drive blades.

Referring also to FIGS. 2 and 3, the individual generators 6 and integrated electric motor 20 are connected to the ties 4 forming the drive mechanism 5 for the array 8. The ties 4 are then connected to the drive shaft 2, which may be splined, which connects to the electromagnetic coupler 28 and then connects directly to the natural flow drive mechanism, e.g., natural flow drive shaft 36.

Each individual generator 6 comprises a rotor 10 and a stator 12. Each of the individual generators is supported on a central support shaft 14 via support brackets 16.

The support brackets 16 are each attached to the central support shaft 14 and extend outwardly therefrom.

The central support shaft 14 supports a number of stators 10 which are bolted to the support brackets on the central support shaft. A ceramic bearing is fixed so that it will in use be located between the stator 12 and respective rotor 10. The rotor 10 is then located over or in-line with the stator 12.

The rotors 10 are connected to each other and to the drive shaft 2, which may be splined, by means of a series of ties 4 forming the drive mechanism 5 which comprises a longitudinally extending array of connecting ties 4. As the drive shaft 2 rotates, the generator array 8 via the series of connecting ties 4 rotates the rotors 10 around the central support shaft 14 and the stators 12.

Each rotor 10 contains a series of polarised magnets (not shown). As the rotor rotates around the stator 12 which contains a series of energising poles and copper wire the poles are energised by the magnets and electricity is produced.

The central support shaft 14 is hollow and is arranged to contain all of the wiring 18 required for the connecting the individual generators.

A brushless electric motor 20 is also provided and mounted on a bracket around the central support shaft and connected to the array ties. The wiring for the motor 20 is also located in the central support shaft.

In this embodiment the generator comprises four rotors and stators, each rotor-stator pair forming an individual generator 6 and also comprises an electric motor 20. The number of individual generators and integrated motors can be increased or decreased dependant on the scale of generation output required from the generator as a whole. It is envisaged that from 2 to 100 individual generators may be used to form the generator.

Each of the individual generators 6 can be fabricated off-site and transported to a location of the generator and connected together on site. Each individual generator 6 is much smaller and easier to transport than a large generator required for more conventional wind turbines.

Electricity generated by the individual generators is either supplied to an electricity supply grid, used locally or stored in an electrical storage device 7.

Turning now to FIG. 2 which illustrates a generator array 8 with vertically arranged blades 22 it can be seen that the generator is housed in a structural support tower 24. The blades 22 are connected to the drive shaft 2, also referred to as a central drive shaft, via a flow drive gearbox 26 and the electromagnetic coupler 28. As shown in FIGS. 2 and 3 the blade arrangement can be in either vertical or horizontal drive configurations. The generator array can also be arranged in a horizontal or vertical configuration.

In the embodiment of FIG. 3 a flow drive gear box 26 is positioned between the natural flow drive shaft 36 and the generator array 8 via the electromagnetic coupler 28. The blades and the natural flow drive shaft 36 are connected to the drive shaft 2 via the electromagnetic coupler 28 to the flow drive gearbox 26. Connection of the drive shaft 2 to the flow drive gear box can be controlled by means of an electro-magnetic coupler 28 which is most clearly seen in FIGS. 2 and 3. The electro-magnetic coupler 28 enables the generator array 8 to be engaged or disengaged from the natural flow drive gearbox 26 when the natural flow is low or if the natural flow is above operational safety limits but energy demand is high. If the natural flow cannot be utilised but the demand is high the drive shaft 2 can be disengaged from the flow drive gear box 26 and the integrated electric motor 20 can be engaged to drive the generator array.

During engagement and disengagement the natural flow drive gear box 26 is slowed and held in place with a friction brake 30. Disengaging and holding the natural flow drive gear stationary allows the generator array to be driven by the electric motor 20 which is powered by a battery power reserve housed on-site near or in the support tower.

As the drive gear is disengaged from the natural flow drive gearbox 26 the integrated electric motor 20 can be engaged to drive the generator array.

Use of the stored energy in the battery to drive the generator array provides a more continuous and controllable supply of electricity to either the grid or off-grid requirements.

As shown schematically in FIG. 1 and described generally supra, preferably a flow of electricity from the generator is monitored and controlled via a controller 11 which may be housed at the installation site. The controller 11 may be a computer. A control circuit is provided which is connected to the controller 11. The controller 11 monitors the flow of electricity from the generator and is controlled remotely or at the installation site. The controller 11 will monitor the generator output; battery charge level; and energy demand from the grid, islanding, generator array rotation speed, natural flow speed, motor engagement, generator array disengagement and engagement from flow drive gear and other sensors housed within the array.

FIG. 3 is similar to FIG. 2 but illustrates and alternative embodiment in which the blades 34 are arranged to rotate a drive shaft 36 that is horizontally connected to the flow drive gear box 26. The same reference numbers are used for the same elements. The air blades are arranged to rotate like a propeller and the natural flow drive shaft 36 is substantially horizontal. The drive shaft 36 is connected to the flow drive gear box 26 which in this case converts the movement to a vertical rotation. As before an electromagnetic coupler 28 is provided; this can move the drive shaft 36 into or out of communication with the flow drive gear box 26.

As before the drive from the flow drive gear box is transferred to the drive shaft and which rotates the rotors of a number of rotor relative to a corresponding number of stators. In this embodiment there is an electric motor and nine individual generators.

Figure 4:
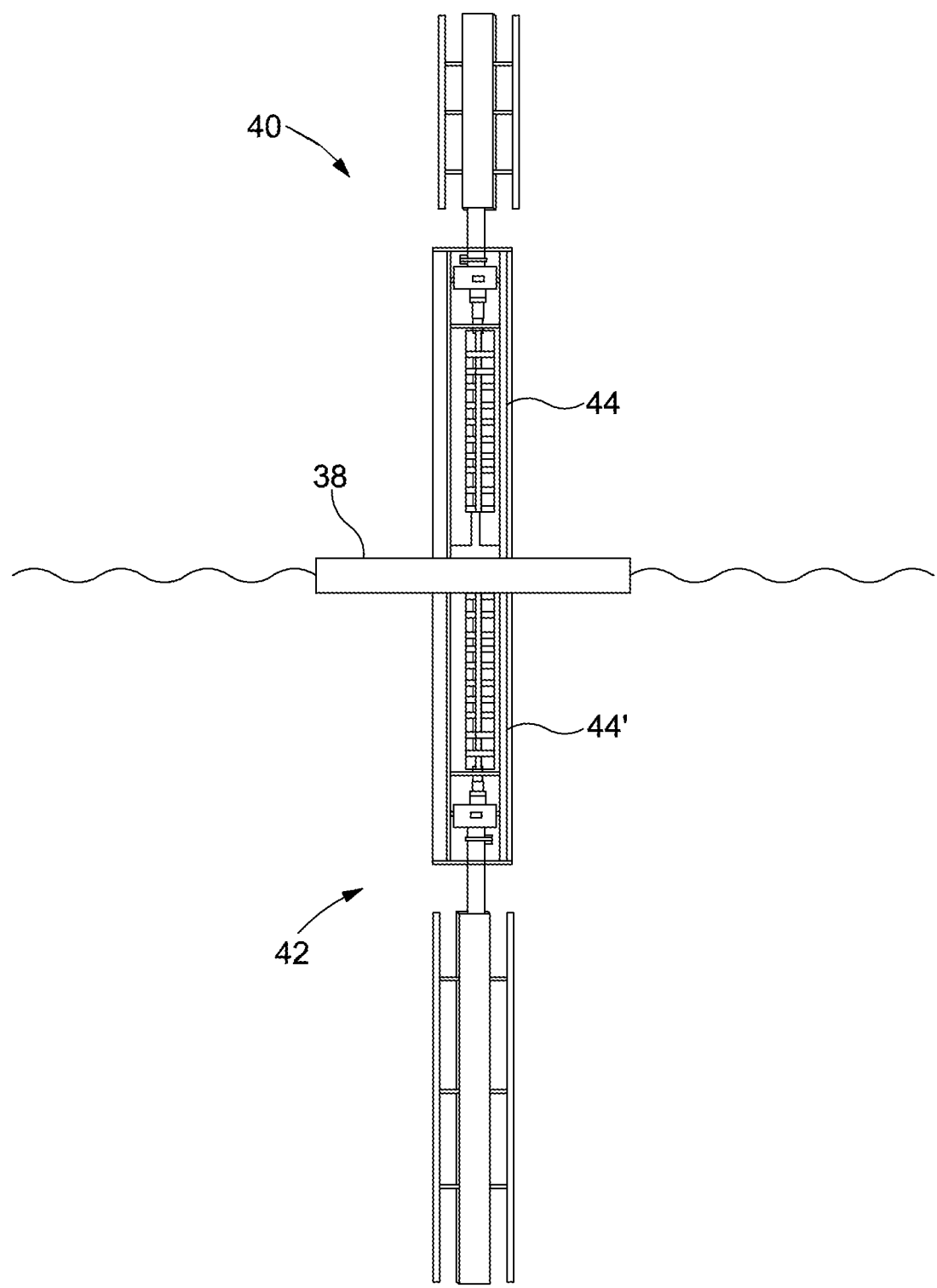
FIG. 4 is a schematic view of a hybrid wind and tidal generator array with vertical flow gear.

FIG. 4 is a schematic illustration of a hybrid wind and tidal configuration which is mounted on a floating platform 38 that can be tethered to other platforms and/or the sea bed or river bed. The hybrid generator array comprises a first generator array 40 arranged to generate electricity from wind power. The hybrid generator comprises a second generator 42 arranged to generate electricity from a tidal water flow. The blade arrangement can be in either vertical or horizontal drive configurations or a combination of both but in this example both blade arrangements are in vertical drive configurations. The support tower 44; 44'is connected to the floating platform 38. It will be appreciated that this configuration or a similar configuration could also be utilised as a land based hydro and wind powered flow solution and or a deep sea wind and sea current flow solution. The support tower 44 extends upwardly and is connected to a wind powered flow solution and the support tower 44' for the tidal flow generator extends downwardly from the platform and is arranged to be water proof.

Figure 5:
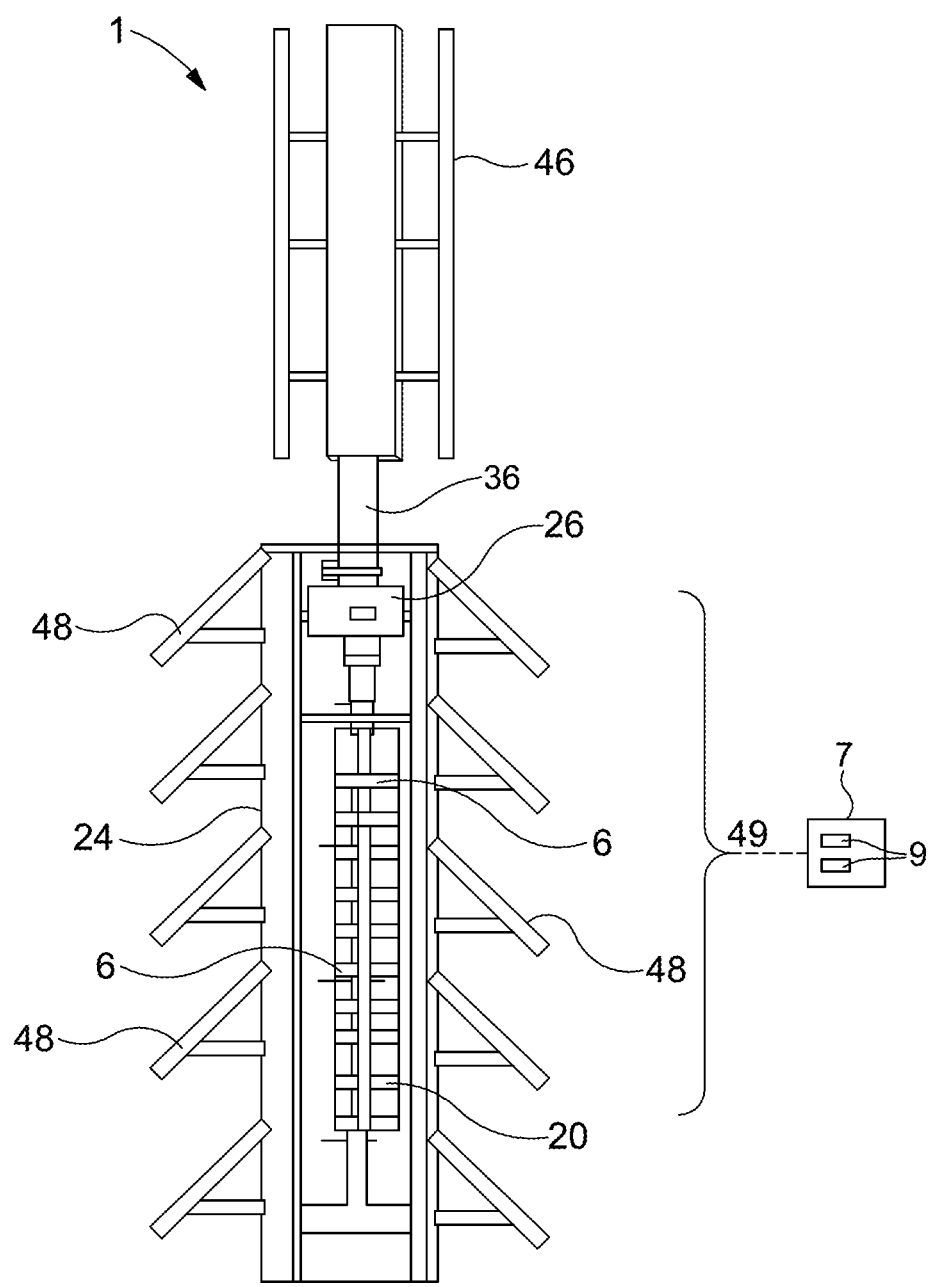
FIG. 5 is a schematic view of a generator array with vertical drive blades and with solar panels attached to a support tower surrounding the generator array.

Turning now to FIG. 5 this illustrates an embodiment with a vertical arrangement of the blades 46 and in which solar panels 48 are attached to an external surface of the support tower 24. The solar panels can be attached 360 degrees around the tower or can be arranged to maximise exposure to sunlight. This configuration would suit all sites but would be especially useful for urban environments, small sites, roof tops, remote locations or mobile or temporary locations and water borne vessels in order to obtain maximum renewable energy capture per square meter of space.

The solar panel array 49 may feed electricity directly to the grid or to a local electrical energy storage device 7. The solar panel array 49 can also be arranged to drive the integrated electric motor to operate the generator array.

Figure 6A:
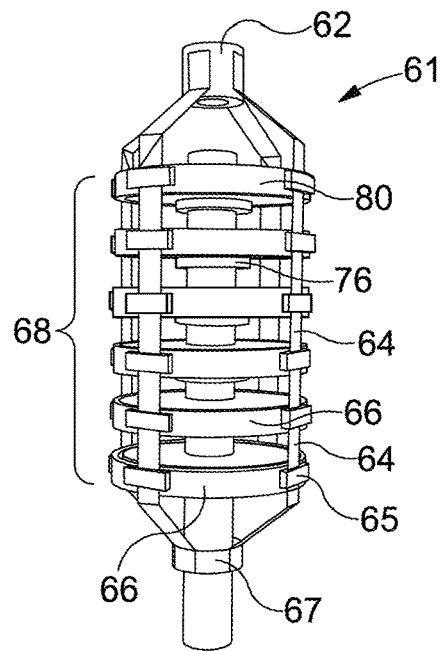
FIG. 6A is a schematic side view of a generator array in accordance with the invention.
Figure 6B:
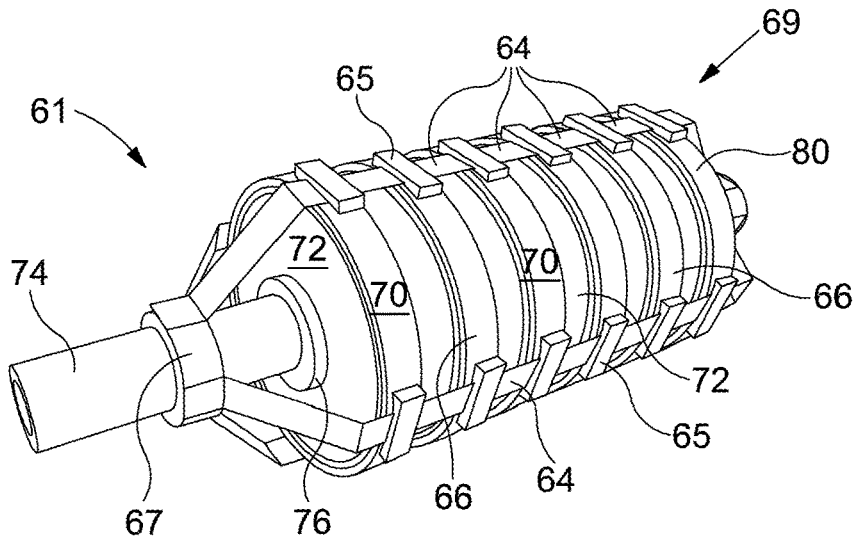
FIG. 6B is a schematic perspective view of the generator array of FIG. 6A.
Figure 6C:
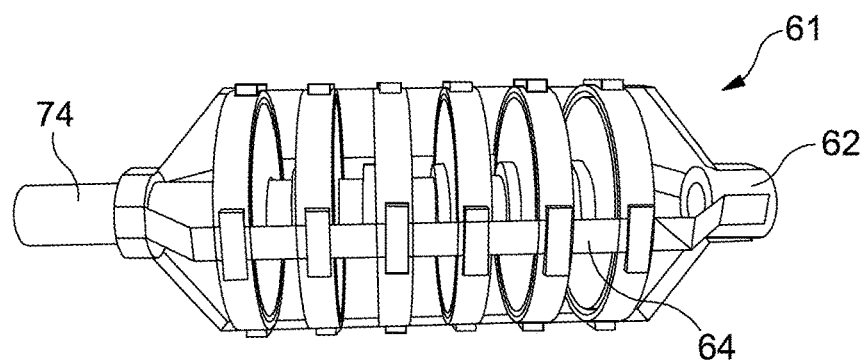
FIG. 6C is a schematic side view of the generator array of FIG. 6A.

FIGS. 6A to 6C show an alternative generator array 61 with five individual generators 66 and one integrated motor 80.

FIG. 6A is a schematic view of the alternative generator 61 in accordance with the invention and arranged to generate electricity from at least one form of natural flow, the generator having a drive shaft 62, also referred to herein as the central drive shaft, driven by a natural energy flow and connected to a number of ties 64 which are in-turn connected to a number, or array 68, of individual generators 66, the number of ties 64 thus forming a drive mechanism 69 for the array 68. Rotation of the drive mechanism 69 in turn rotates the array 68 and generates electricity. The generator array 68 comprises a plurality of individual generators 66 each of which is also connected to the natural flow drive mechanism via the electromagnetic coupler, each individual generator being arranged to use rotation of the drive mechanism or the integrated electric motor 80 to generate electricity.

The individual generators 66 and integrated electric motor 80 are connected to the ties 64 forming the drive mechanism 69 for the array. The ties 64 are then connected to the drive shaft 62, which may be splined, which connects to the electromagnetic coupler and then connects directly to the natural flow drive mechanism, e.g., natural flow drive shaft 36, as shown, for example, in FIGS. 2 and 3.

Each individual generator 66 comprises a rotor 70 and a stator 72. Each of the individual generators is supported on a central support shaft 74 via support brackets 76.

The support brackets 76 are each attached to the central support shaft 74 and extend outwardly therefrom.

The central support shaft 74 supports a number of stators 72 which are bolted to the support brackets on the central support shaft. A ceramic bearing is fixed so that it will in use be located between the stator 72 and respective rotor 70. The rotor 70 is then located over or in-line with the stator 72.

The rotors 70 are connected to each other and to the drive shaft 62, which may be splined, by means of a series of ties 64 forming the drive mechanism 69 which comprises a longitudinally extending array of connecting ties 64. As the drive shaft 62 rotates, the generator array 68 formed by the series of connecting ties 64 rotates the rotors around the central support shaft 74 and the stators 72.

Tie connecting mounts 65 are provided on each rotor 70, including the rotor of the electric motor 80, to facilitate connection of the ties 64 to each rotor to couple the generators and motor together.

In alternative embodiments, more than one integrated electric motor 80 may be provided within a single array 68.

In the example shown in FIGS. 6A to 6C, four ties are provided to connect the generator array. The ties are rigid and arranged longitudinally along the array such that each rotor is connected to each tie.

In alternative embodiments, a different number of ties may be provided, for example 3, 5, 6, 7, 8, 9 or 10 ties. In alternative or additional embodiments, not all rotors may be connected to all ties—for example, each rotor may be connected to alternate ties, or only to a subset of the ties. In alternative or additional embodiments, the ties may not be longitudinal and may instead, for example, curve around the generator array.

At one end, the ties 64 are connected to a bearing 67. The bearing is retained on, and rotates freely on, the central support shaft 74, so allowing the rotors to rotate with respect to the stators.

At the other end, the ties 64 are connected to the drive mechanism via an electromagnetic coupler or clutch knot shown) on the drive shaft 62. The array can therefore be decoupled from the natural flow when desired.

The skilled person would understand that the motor 80 may be located anywhere along the array 68 in alternative examples, and is not limited to being at one end of the array as shown in FIGS. 6A-C.

Any of the features discussed with respect to the examples shown in FIGS. 1 to 5 can be applied to the example shown in FIGS. 6A-C.

It will be appreciated that although the generator array in this embodiment has been described as being driven at least in part by natural flows the design of the array lends itself to be utilised in numerous other applications. For example, the array may be utilised to generate sufficient electricity to charge an energy storage device or devices. The electricity stored can be utilised to drive the integrated electric motor and to rotate the array. It will be appreciated that rotation of the array can drive a further mechanical device which may be attached to the array or arrays.

The invention claimed is:

1. An electrical energy generator apparatus, arranged to generate electricity from at least one form of natural flow, the electrical energy generator apparatus having a drive mechanism, a natural flow drive shaft, and an integrated electric motor;

the natural flow drive shaft being arranged to be driven by energy from a natural energy flow;

the natural flow drive shaft being engageably connected to the drive mechanism and the integrated electric motor being connected to the drive mechanism;

the electrical energy generator apparatus further comprising an array of individual electrical energy generators arranged in series, each individual electrical energy generator supported on a central support shaft and connected together via a series of rigid ties longitudinally extending along the array, the series of rigid ties forming the drive mechanism, and wherein the array of individual electrical energy generators is rotatable around the central support shaft by the drive mechanism to generate electricity; wherein rotation is driven by the natural flow drive shaft when the natural flow drive shaft is connected to the drive mechanism, and rotation is driven by the integrated electric motor when the natural flow drive shaft is disconnected from the drive mechanism.

2. The electrical energy generator apparatus according to claim 1 further comprising an electrical storage device, wherein electricity generated by rotation of the drive mechanism is stored in the electrical storage device.

3. The electrical energy generator apparatus according to claim 2 wherein the electrical storage device comprises one or more batteries.

4. The electrical energy generator apparatus according to claim 1 wherein each individual electrical energy generator comprises a rotor and stator brushless type generator.

5. The electrical energy generator apparatus according to claim 1 wherein the natural flow drive shaft may be driven by wind, solar, tidal or hydro flows or a combination of flows.

6. The electrical energy generator apparatus according to claim 1 wherein the array of individual electrical energy generators are supported on the central support shaft and connected by the series of rigid ties of the drive mechanism to increase overall capacity of the electrical energy generator apparatus.

7. The electrical energy generator apparatus according to claim 1 wherein the electrical energy generator apparatus further comprises an electrical storage device arranged to power the integrated electric motor.

8. The electrical energy generator apparatus according to claim 7 wherein the integrated electric motor is arranged to be engaged with the drive mechanism and is arranged to be able to use energy stored in the electrical storage device to rotate the array of individual electrical energy generators and to drive the individual electrical energy generators when the natural flow drive shaft is disengaged.

9. The electrical energy generator apparatus according to claim 8, the electrical energy generator apparatus further comprising an electromagnetic coupler, wherein the array of individual electrical energy generators is engaged/disengaged with the natural flow drive shaft by the electromagnetic coupler.

10. The electrical energy generator apparatus according to claim 9, the electrical energy generator apparatus further comprising a flow drive gear box located between the natural flow drive shaft and the drive mechanism which is arranged to be disengageable.

11. The electrical energy generator apparatus according to claim 1, wherein the electrical energy generator apparatus further comprises an electrical storage device arranged to be charged by the natural flow of energy and to be able to power the integrated electric motor to drive the array of individual electrical energy generators at times when the natural flow cannot be utilized to drive the array.

12. The electrical energy generator apparatus according to claim 1, wherein the series of rigid ties includes at least three rigid ties.

13. The electrical energy generator apparatus according to claim 1, the apparatus further comprising a controller arranged to monitor and control a flow of electricity from the array of individual electrical energy generators.

14. The electrical energy generator apparatus according to claim 13, the electrical energy generator apparatus further comprising a battery, wherein electricity generated by rotation of the drive mechanism is stored in the battery, and a flow drive gear box located between the natural flow drive shaft and the drive mechanism which is arranged to be disengageable, and wherein the controller is a computer arranged to monitor at least one of output from the array of individual electrical energy generators; a battery charge level associated with the battery; energy demand; islanding; rotation speed; natural flow speed; engagement of the integrated electric motor; disengagement from the flow drive gear box; and other sensors housed within the electrical energy generator apparatus.

15. The electrical energy generator apparatus according to claim 1 wherein the natural flow drive shaft is driven by a wind, hydro or tidal driven blades that may be horizontally or vertically mounted or wherein the array of individual electrical energy generators is rotated by means of the integrated electric motor using solar energy generated by a solar panel array.

16. The electrical energy generator apparatus according to claim 1, further comprising a structural support tower, a solar panel array mounted on the structural support tower, and an electrical storage device, wherein solar energy from the solar panel array is stored in the electrical storage device.

17. The electrical energy generator apparatus according to claim 1 wherein each individual electrical energy generator comprises a rotor and a stator and a bearing provided between the respective rotor and stator and wherein each bearing is a single high life cycle sealed ceramic bearing.

18. The electrical energy generator apparatus according to claim 1, wherein each individual electrical energy generator of the array comprises a rotor and a stator forming a brushless type generator, the stators of the individual electrical energy generators being supported on the central support shaft, and the rotors of the individual electrical energy generators being longitudinally connected together via the series of rigid ties forming the drive mechanism and being rotatable around the central support shaft by the drive mechanism to generate electricity.

19. An individual electrical energy generator comprising a rotor and a corresponding stator mounted on a support bracket on a shaft portion, the shaft portion being connectible to a corresponding shaft portion of another individual electrical energy generator to form an array of individual electrical energy generators arranged in series on a central support shaft, and wherein the rotor comprises one or more rigid tie elements adapted to be connectable to another rotor of the another individual electrical energy generator and extending longitudinally along the array to form a drive mechanism, wherein the array of individual electrical energy generators is rotatable around the central support shaft by the drive mechanism to generate electricity.

20. A method of making an electrical energy generator, the method comprising providing a central support shaft and a natural flow drive shaft rotatable by at least one natural flow, the method further comprising mounting a first and a second individual electrical energy generator in accordance with claim 19 on the central support shaft, connecting the shaft portion of the first individual electrical energy generator to the shaft portion of the second electrical energy generator on the central support shaft to form an array of electrical energy generators; connecting the one or more rigid tie elements of the first rotor of the first individual electrical energy generator to the second rotor of the second electrical energy generator, wherein the rigid tie elements form the drive mechanism for the array; and engageably connecting the drive mechanism to the natural flow drive shaft.

* * * * *